Jan. 1, 1946.  H. T. YOUNGREN  2,392,280
DISINTEGRATING LINK FOR AIRPLANE CANNON
Filed April 17, 1943
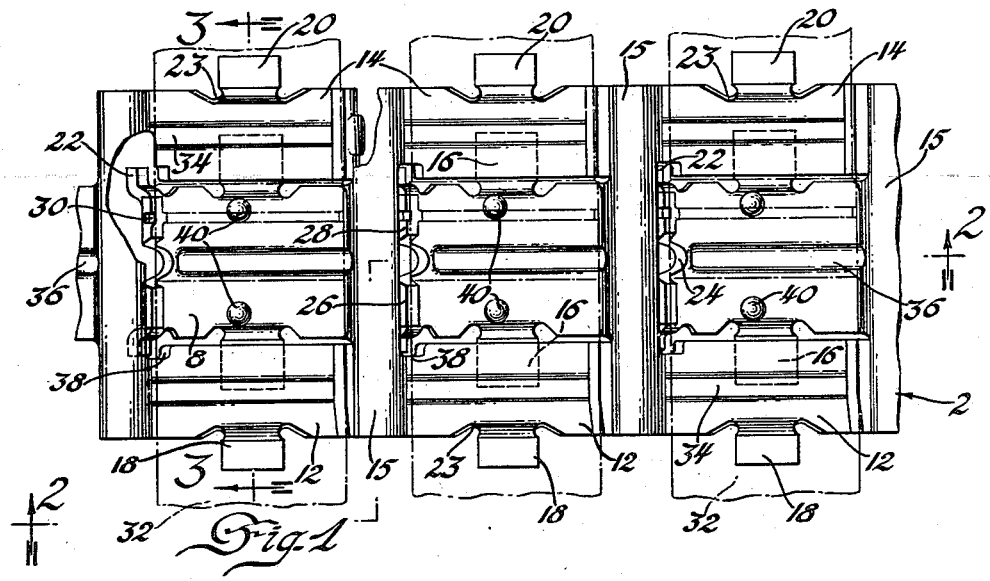
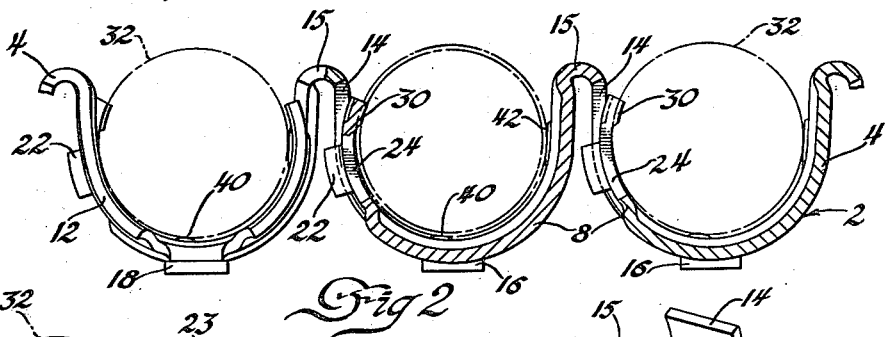
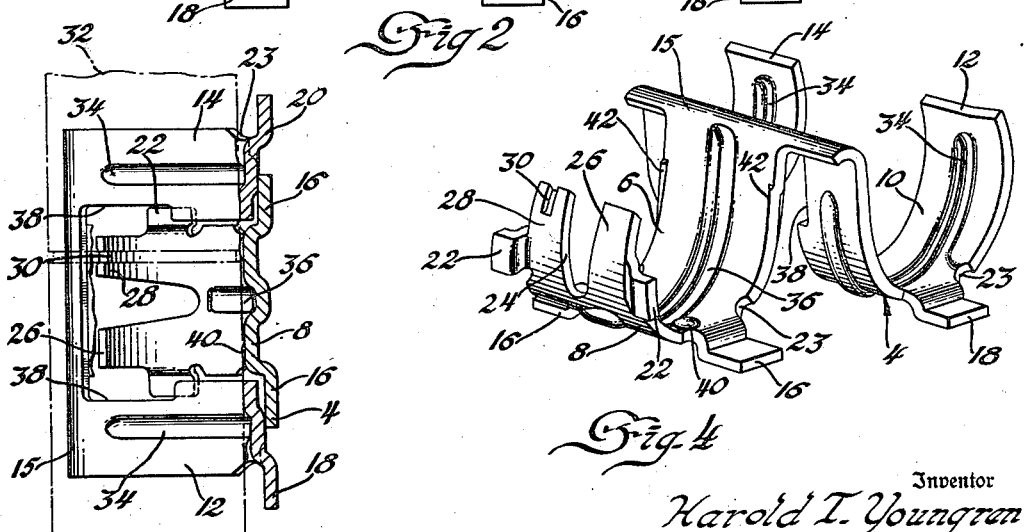
Inventor
Harold T. Youngren
By Blackmore, Spencer & Oliver
Attorneys Patented Jan. 1, 1946

2,392,280

UNITED STATES PATENT OFFICE 2,392,280

DISINTEGRATING LINK FOR AIRPLANE CANNON

Harold T. Youngren, Lansing, Mich., assignor to General Motors Corporation, Detroit, Mich., a corporation of Delaware Application April 17, 1943, Serial No. 483,520

3 Claims. (Cl. 89—35)

This invention relates to a disintegrating link belt for use with the cannon used in airplanes.

The belt comprises a plurality of duplicate links capable of meshing or interfitting with each other in a hinge-like relation. In use the links of the belt are held together by the cartridge used in the cannon and after the cartridge has been withdrawn from the belt to use in the cannon, the belt passes through the loading mechanism and disintegrates; i. e., each link, as it passes through the mechanism, falls away or separates from the belt.

Each link comprises two integrally united substantially semicircular arcuate portions, one portion comprising two spaced tines and the other portion a single tine. The single tine of one link fits between the tines of the adjacent link and each single tine has spaced offset tabs which work or slide on the backs of the two tines. The cartridge is received in the arcuate semicircle of the assembled three tines of the adjacent links, and the single tine has a circumferential length a little greater than a semicircle to enable it to grip and hold the cartridge. The end of the single tine is also made resilient by removing the middle part to form two short smaller tines. This resiliency at the tine end enables an easier removal of the cartridge. The cartridge is gripped and held by the single tine only, because the width at the mouth or of the cord of the two-tine semicircular portion is at least as large as a diameter of the semicircular portion.

On the drawing:

Figure 1 is a plan view of a portion of the belt with the cartridge shown in dotted outline.

Figures 2 and 3 are sections on the lines 2—2 and 3—3 of Figure 1.

Figure 4 is a perspective view of one of the links.

Referring to the drawing, the numeral 2 indicates the belt as a whole. The belt is composed of a plurality of individual links 4, stamped from a sheet of metal and each of which is a duplicate of the other. Each link 4 is suitably formed to the desired shape and comprises a semicircular portion 6 comprising a single tine 8, and a second semicircular portion 10 comprising two tines 12 and 14. The mouths of the arcuate portions 6 and 10 face in the same direction as is shown in Figure 4 and the two portions are integrally connected by the bight part 15 which is in reality a continuation of the tines 8, 12 and 14.

The tine 8 has integral alignment tabs 16 at the bottom of the arc of its semicircle and each of the tines 12 and 14 has a feeding tab 18 and 20 at the bottom of the arc of its semicircle. The tine 6 has additional alignment tabs 22 adjacent its end. All of these tabs are offset from the body of the tines as is best shown in Figures 3 and 4. Adjacent the sides of the tabs the metal of the link is cut away as shown at 23 to enable the tabs to be more easily bent to the shape shown.

The end of the tine 8 has a portion of the metal removed therefrom to form the recess 24. The end is thereby formed into the shorter and smaller tines 26 and 28. The tine 28 has a portion of the metal pressed inwardly of the arc of the tine as shown at 30 to form a projection to enable the tine 8 better to grip and hold the cartridges 32, shown in dotted outline.

The backs of the tines 12 and 14 have ribs 34 pressed therein, and the tine 8 has a rib 36 pressed therein; these ribs being for strengthening purposes. In addition the ribs 34 cooperate in bearing relation with the tabs 16 when the link belt is assembled as will be hereafter described.

Adjacent the bight portion 15, the inside of each tine 12 and 14 has a cut-away or recessed part 38 which is for the purpose of accommodating the tabs 22 in assembling the links 4. The overall width between the ends of the tabs 22 is less than the overall width between the sides of the recesses 38.

Special protuberances or projections are provided to retain a cartridge or round of ammunition in the link. Two protuberances 40 are provided at the bottom of the arc of each tine 8. There are also two projections 42 on the tine 8 adjacent the bight 15. The three projections 30, 40, and 42 are spaced and are so positioned that the end projections 30 and 42 are a little more than 180° apart. The round of ammunition 32 is pressed into the mouth of the tine 8 and is held by the projections. The cartridge is held slightly spaced from the body of the tine 8 by the projections as is shown in Figure 2. By locating the cartridge at three circumferentially spaced points, control of the pull-out is simplified and slight variations in the shape of the link are not detrimental.

The links 4 are assembled to form the belt 2 by placing the tine 8 between the tines 12 and 14, taking care that the end tabs 22 pass through the recesses 38 and lie on the outer periphery of the tines 12 and 14 and the tabs 16 are likewise outside the periphery of tines 12 and 14 respectively, permitting the arcuate tine 8 to mate with the arcuate tines 12 and 14 respectively. The tabs 16 of the tine 8 will be in the same plane with the tabs 18 and 20 of the tines 12 and 14 as is best shown in Figures 2 and 3. Thus when the belt of cartridges is disposed in a feed channel of an automatic firearm, the tabs 16, 18 and 20 will lie in abutting relationship to the floor or roof of such feed channel, as the case may be, and hence prevent limited transverse displacement of the double tines 12 and 14 relative to the single tine 8 that would otherwise be possible. With the links in a straight line as shown in Figure 2, the tabs 22 will be in the recess 38 formed between the tines 12 and 14. A cartridge 32 can now be pressed into the arcuate tine 8 which has a circumferential extent a little greater than 180° to enable the tine to grip and hold the cartridge. The short end tines 26 and 28 give a resiliency to the end and enable an easier application and removal of the cartridge. The inwardly pressed part 30 will be pressed against the cartridge to obtain a better grip thereon. The mouth of the arcuate tines 12 and 14 is at least as great as a diameter of a cartridge and these tines therefore will have no gripping action on the cartridge and are free to flex or turn (on the axis of the cartridge) with reference to the tine 8 of the adjacent link. When the belt hinges or flexes, the tabs 16 will ride over the ribs 34 on the backs of the tines 12 and 14 of the adjacent link, and the tabs 22 will ride over the outside periphery of the tines 12 and 14 bearing against that portion of each tine lying inside the ribs 34. See Figure 3. As has already been mentioned the tabs 22 of the single tine 8 can pass through the recesses 38 of the double tined portion 10. Thus a greater extent of rotation of one link with respect to the adjacent link of an assembled belt may be obtained. For example, if the right hand link and cartridge were to be rotated in a clockwise direction about the center cartridge of Fig. 2, the tabs 22 pass through recesses 38 and thus the extent of rotation is limited only by the tabs 16, or tabs 18 and 20, engaging bight part 15. Hence the desirable alignment effect of two sets of tabs on the single tine is obtained without reducing the extent of relative angular displacement possible between adjacent links.

The airplane cannon has a feed mechanism through which the belt laden with cartridges passes. The belt passes through the feed mechanism inverted from the position shown in Figure 3, and this mechanism has oppositely disposed grooves in which the tabs 18 are received to guide the belt through the mechanism. When the mechanism takes a cartridge from the belt and advances the belt, one of the links will reach the opposite side of the mechanism and because it has no cartridge to hold it to the adjacent link, the two tined portion 4 of one link will fall away from the single tined portion 6 of the adjacent link to cause the disintegration of the belt.

I claim:

1. A disintegrating link belt for feeding cartridges into an automatic firearm, each link being a duplicate of the other and removably and hingedly interfitting with each other, each link comprising two integrally united, oppositely extending, susbtantially semi-circular arcuate portions, one portion having two spaced tines and the other portion having a single tine, the single tine of one link being adapted to fit in the space between two tines of the adjacent link in the assembled link belt, said single tine being slightly greater than a semi-circle and of diameter selected to enable said single tine to grip and hold a cartridge, said double tines being substantially a semi-circle of diameter selected to enable said double tines to freely rotate about a cartridge, a feeding tab on each outside edge of said double tined portion, each feeding tab being formed to provide a substantially planar portion lying outside the arc of said double tines, said planar portions being located in opposed co-planar relationship and adapted to be engaged by the feeding mechanism of the automatic firearm, and an alignment tab on each outside edge of said single tine, each alignment tab being formed to provide a substantially planar portion lying outside the arc of said single tine, said planar portions of said alignment tabs being located in opposed relationship with their exterior surfaces substantially co-planar with the exterior surfaces of the said planar portions of said feeding tabs.

2. A disintegrating link belt for feeding cartridges into an automatic firearm, each link being a duplicate of the other and removably and hingedly interfitting with each other, each link comprising two integrally united, oppositely extending, substantially semi-circular arcuate portions, one portion having two spaced tines and the other portion having a single tine, the single tine of one link being adapted to fit in the space between two tines of the adjacent link in the assembled link belt, said single tine being slightly greater than a semi-circle and of diameter selected to enable said single tine to grip and hold a cartridge, said double tines being substantially a semi-circle of diameter selected to enable said double tines to freely rotate about a cartridge, a feeding tab on each outside edge of said double tined portion, each feeding tab being formed to provide a substantially planar portion lying outside the arc of said double tines, said planar portions being located in opposed co-planar relationship and adapted to be engaged by the feeding mechanism of the automatic firearm, an outwardly projecting stiffening rib formed in each tine of said double tined portion, and an alignment tab on each outside edge of said single tine, each alignment tab being formed to provide a substantially planar portion lying outside the arc of said single tine, said planar portions of said alignment tabs being located in opposed relationship with their exterior surfaces substantially co-planar with the exterior surfaces of the said planar portions of said feeding tabs and the interior surfaces of said alignment tabs arranged to respectively engage, in the assembled link belt, the exterior of the stiffening ribs on the double tined portion of the adjacent link.

3. A disintegrating link belt for feeding cartridges into an automatic firearm, each link being a duplicate of the other and removably and hingedly interfitting with each other, each link comprising two integrally united, oppositely extending, substantially semi-circular arcuate portions, one portion having two spaced tines and the other portion having a single tine, the single tine of one link being adapted to fit in the space between two tines of the adjacent link in the assembled link belt, said single tine being slightly greater than a semicircle and of diameter selected to enable said single tine to grip and hold a cartridge, said double tines being substantially a semi-circle of diameter selected to enable said double tines to freely rotate about a cartridge, and a plurality of spaced alignment tabs on each outside edge of said single tine, each of said alignment tabs projecting from said single tine in a direction substantially parallel to the axis of the tine, the tabs on one edge being located in opposed relationship to the tabs on the other edge, each of said alignment tabs being arranged to engage, in the assembled link belt, the exterior periphery of the double tined portion of the adjacent link, each of said double tines having a cutaway portion formed in its interior edge adjacent the secured end of said double tined portion, said cutaway portions being located in opposed relationship and arranged to permit, in the assembled link belt, at least one set of opposed alignment tabs of the single tined portion of the adjacent link to pass therethrough, whereby one link may be rotated with respect to the adjacent link through a substantial angle.

HAROLD T. YOUNGREN.